United States Patent [19]

Temple, Jr.

[11] 4,295,767
[45] Oct. 20, 1981

[54] CORROSION RESISTANT FASTENER

[76] Inventor: John W. Temple, Jr., Box 43, Signal Mountain, Tenn. 37377

[21] Appl. No.: 97,361

[22] Filed: Nov. 26, 1979

[51] Int. Cl.³ .................................................. F16B 27/00
[52] U.S. Cl. ...................................... 411/377; 411/378
[58] Field of Search .................. 85/1 JP, 54, 53, 9 R, 85/28; 151/38; 411/377, 373, 378, 383, 903

[56] References Cited

U.S. PATENT DOCUMENTS

| | | | |
|---|---|---|---|
| 1,208,620 | 12/1916 | Moser | 85/1 JP X |
| 1,867,354 | 7/1932 | Dickson | 85/54 X |
| 3,452,636 | 7/1969 | Cohen et al. | 85/1 JP |
| 3,566,738 | 3/1971 | Cupit | 85/1JP |
| 3,803,972 | 4/1974 | Deutsher | 85/1 JP |

FOREIGN PATENT DOCUMENTS 625345  6/1949  United Kingdom ................... 85/54

Primary Examiner—Ramon S. Britts
Attorney, Agent, or Firm—Alan Ruderman

[57] ABSTRACT

A corrosion resistant screw type fastener has a carbon steel threaded shank with a die cast zinc or aluminum head, and a reformable plastic washer positioned about the shank and partly received within the head. The shank has a retaining portion having a polygonical configuration and a cylindrical portion between the retaining portion and the threads. The retaining portion has a larger cross-sectional configuration than the cylindrical portion for preventing axial movement between the head and the shank. An annular recess is formed between the head and part of the cylindrical portion for receiving the washer which is thicker than the depth of the recess. When the fastener is threaded into the work the heat and pressure generated reform the washer to completely fill the recess and provide an effective seal against corrosive elements.

7 Claims, 4 Drawing Figures

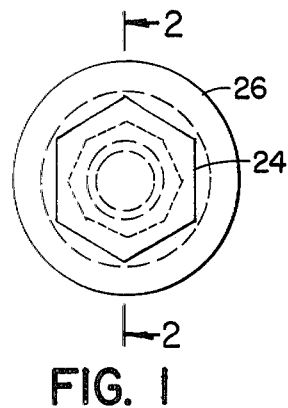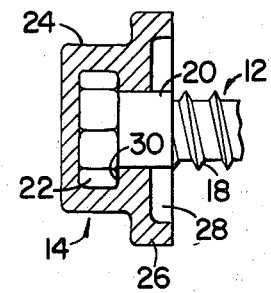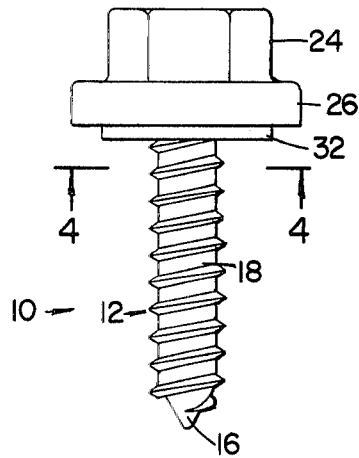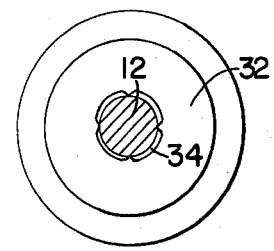
FIG. 1
FIG. 2
FIG. 3
FIG. 4

CORROSION RESISTANT FASTENER

BACKGROUND OF THE INVENTION

This invention relates to fasteners and more particularly to a corrosion resistant threaded fastener having a non-ferrous metallic head and a ferrous metallic shank.

In the fabrication of elements for outside use and particularly in the building construction field, it is important that the threaded fasteners securing the elements be resistant to the corrosive effects of the weather. Although there have been many fastener constructions proposed for elimination of this difficulty none are fully acceptable. For example, stainless steel, because of its resistance to corrosion has gained some acceptance. However, because of the high cost of stainless steel most fasteners available are presently constructed of carbon steel.

In order to reduce corrosion many of the carbon steel fasteners are coated or plated with zinc or some other noncorrosive material. However, since the threaded fasteners are self-tapping the coating on the threads is penetrated during the securing process. Thus, seals are provided about the head of the fastener to prevent rain water or other contaminates from leaking past the head and onto the threaded stud causing rust or other corrosive effects. Furthermore, during the securing process, and with time, the coating of the heads of the fasteners become scratched, gouged or the like and allow weather conditions to penetrate the carbon steel, eventually causing corrosive failures of the heads.

In attempts to overcome these deficiencies, the prior art has proposed the molding of a self-sealing plastic head onto the threaded stud member. Various known examples of these prior art proposals using plastic heads are illustrated in U.S. Pat. Nos. 3,134,290; 3,557,654; 3,618,444 and 4,154,138. It has now been found that the plastic, even if not initially cracked during the securing process, tends to fail after relatively short periods of time. Plastics have a resin or plasticizer which dry or bake out when the plastic is subjected to heat and sunlight. The dried-out plastic when undergoing expansion and contraction during changes in weather conditions subsequently cracks, resulting in direct contact of the corrosive environment on the carbon steel threads and failure thereof. Thus, plastic headed fasteners have fallen out of favor and are not now extensively used under these environmental conditions.

SUMMARY OF THE INVENTION

Consequently, it is a primary object of the present invention to provide a headed threaded fastener that is corrosion resistant and has a long life expectancy under outside environmental conditions.

It is another object of the present invention to provide a threaded fastener having a head of a non-ferrous metal secured to a threaded stud, the combination having a seal accepting configuration.

It is a further object of the present invention to provide a corrosion resistant threaded fastener having a non-corrosive metallic head die cast onto an ordinary steel threaded stud, the head and stud having complimentary configurations for preventing rotational and axial movement relatively therebetween, and the head having a configuration for receiving a reformable washer for sealing between the head and the stud.

In accordance with the invention a conventional threaded steel stud is provided with a die cast zinc or aluminum head and a reformable plastic washer positionable about the stud and partly received within the head. The stud and head have cooperating complimentary retaining means for permanently securing the head to the stud with no relative movement therebetween. The head includes an annular cavity between a circumferential skirt and the stud for receiving the washer radially and partly axially therein. When the fastener is secured in use the washer can thus reformably flow about the stud, and flow into and fill the cavity.

BRIEF DESCRIPTION OF THE DRAWINGS

The particular features and advantages of the invention as well as other objects will become apparent from the following description taken in connection with the accompanying drawings, in which:

FIG. 1 is a top view greatly enlarged of a fastener constructed in accordance with the principles of the present invention;

FIG. 2 is a fragmentary sectional view of the fastener taken substantially along line 2—2 of FIG. 1;

FIG. 3 is an elevational view of the fastener of FIGS. 1 and 2 with the washer positioned thereon; and FIG. 4 is a sectional view taken substantially along line 4—4 of FIG. 3.

DESCRIPTION OF THE PREFERRED EMBODIMENT

Referring to the drawings a fastener 10 constructed in accordance with the present invention is illustrated as a screw having a conventional metal shank 12 which may be of a carbon steel, and a non-ferrous head 14 preferably of zinc or aluminum. The major portion of the shank 12 is threaded from the pointed tip 16 with conventional threads 18 which preferably may be of the self-tapping type generally used for securing metallic elements.

The head portion of the shank remote from the tip 16 including a substantially cylindrical portion 20 adjacent the threads, of substantially the same diameter as the outside diameter of the threads, and a non-circular securing portion 22 remote from the threads, of a larger cross-sectional configuration than the cylindrical portion. As illustrated, the portion 22 preferably may be of an octagonical configuration to provide good retaining strength between the shank and head 14.

The head 14 preferably has a conventional hexigonical torquing portion 24 from which a larger and depending circular skirt 26 extends. The head is die cast in a mold about the head portion of the shank with an annular cavity 28 provide between the skirt 26 and approximately half of the cylindrical portion 20. The mold as contemplated consists of 3 pieces for obtaining the proper cooperation with the shank and for subsequent ease of removal of the fastener from the mold. The metal, whether of zinc or aluminum, will flow in the mold and engage and encapsulate the securing portion 22 of the shank and part of the cylindrical portion 20. When removed from the mold the head is retained against rotational movement relatively to the shank by the cooperation of the securing portion 22 with the complementary metal of the head, and against axial movement relatively to the shank by virtue of the shoulder 30 formed between the securing portion 22 and the cylindrical portion 20. Thus, a permanent retention is provided between the head and the shank.

After removal of the fastener from the mold a seal 32, illustrated in FIGS. 3 and 4, having a central aperture 34 is assembled onto the shank and positioned in the cavity 28. The seal preferably comprises PVC or a thermoplastic material similar thereto which can be compressed and which is reformable when subjected to heat and pressure. The seal 32 has an outer diameter substantially equal to that of the cavity and has an axial dimension larger than the depth of the cavity so that it fills the cavity and extends partly outside thereof.

When used for securing work pieces (not illustrated) together, the fastener is threaded into the work by a conventional power tool which rotates the head rapidly. The head generated by threading the metal shank into metal work pieces rapidly, is conducted through the shank to the seal 32. As the head 14 is tightened down against the work piece, the seal is compressed under a relatively high temperature and pressure and reformed to fill all the minute voids and crevices in the cavity and flow outwardly about the threads adjacent the cylindrical portion 20 and under the skirt. An exeptionally effective seal is thus provided to prevent corrosive elements from contacting the carbon steel shank. Thus, since the zinc or aluminum head is noncorrosive to environmental conditions, the fastener is effectively corrosion resistant and has a life expectancy substantially longer than that of known fasteners of similar cost.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus described the nature of the invention, what is claimed herein is:

1. A corrosion resistant screw-type fastener comprising a ferrous metal body having an axially extending shank with external threads and a retaining head, said retaining head having a cylindrical portion adjacent said threads and a retaining portion adjacent said cylindrical portion remote from said threads, said retaining portion having a larger radial cross-sectional configuration than that of said cylindrical portion, a non-ferrous metal head fixedly disposed in engagement with and encapsulating the retaining portion and an adjacent part of the cylindrical portion, said non-ferrous head having an axially depending skirt spaced radially from the non-encapsulated part of the cylindrical portion to define an annular recess between the skirt and the non-encapsulated cylindrical portion, and a disk shaped seal positioned about said non-encapsulated, cylindrical portion wholly within the circumferential confines of said recess and extending partly outside the axial confines of said recess.

2. A corrosion resistant fastener as recited in claim 1 wherein said seal comprises a thermoplastic material reformable under heat and pressure.

3. A corrosion resistant fastener as recited in claim 2 wherein said non-ferrous metal is zinc.

4. A corrosion resistant fastener as recited in claim 2 wherein said non-ferrous metal is aluminum.

5. A corrosion resistant fastener as recited in claim 2, wherein said retaining portion and said non-ferrous head each have a polygonical configuration, said retaining portion having a greater number of sides then said non-ferrous head.

6. A corrosion resistant fastener as recited in claim 3 or 4 wherein said retaining portion and said non-ferrous head each have a polygonical configuration, said retaining portion having a greater number of sides than said non-ferrous head.

7. A corrosion resistant fastener as recited in claim 2 wherein said seal has an outer circumferential surface substantially equal to the circumference of the skirt defining said recess.

\* \* \* \* \*